United States Patent

Haerle

[11] Patent Number: 5,405,423
[45] Date of Patent: Apr. 11, 1995

[54] FILTER FOR THE SEPARATION OF IMPURITIES FROM WASTE GASES

[75] Inventor: Hans A. Haerle, Bopfingen, Germany

[73] Assignee: Schwaebische Huettenwerke GmbH, Germany

[21] Appl. No.: 137,600

[22] Filed: Oct. 15, 1993

[30] Foreign Application Priority Data

Oct. 16, 1992 [DE] Germany ............ 42 34 930.3

[51] Int. Cl.⁶ .................................. B01D 46/00
[52] U.S. Cl. ..................... 55/523; 55/DIG. 10; 55/DIG. 30
[58] Field of Search ............ 55/495, 497, 499, 514, 55/521, 523, DIG. 10, DIG. 30; 95/273, 278, 283

[56] References Cited

U.S. PATENT DOCUMENTS

| | | |
|---|---|---|
| 3,702,049 | 11/1972 | Morris, Jr. ............... 55/514 |
| 4,220,625 | 9/1980 | Toh et al. |
| 4,652,286 | 3/1987 | Kusuda et al. ........ 55/DIG. 30 |
| 4,659,348 | 4/1987 | Mayer ..................... 55/DIG. 30 |
| 5,009,857 | 4/1991 | Haerle. |
| 5,174,968 | 12/1992 | Whittenberger ....... 55/DIG. 30 |
| 5,204,067 | 4/1991 | Haerle. |
| 5,215,724 | 6/1993 | Haerle ..................... 55/523 |
| 5,229,078 | 7/1993 | Haerle ..................... 55/DIG. 30 |

FOREIGN PATENT DOCUMENTS

| | | |
|---|---|---|
| 3818281 | 3/1988 | Germany. |
| 331885 | 1/1989 | Germany. |
| 470365 | 7/1991 | Germany. |
| 2037607 | 7/1980 | United Kingdom. |
| 2058601 | 4/1981 | United Kingdom ........ 55/DIG. 30 |

Primary Examiner—Charles S. Bushey
Attorney, Agent, or Firm—Welsh & Katz, Ltd.

[57] ABSTRACT

A filter for the separation of impurities from waste gases, in particular from the exhaust gases of an internal combustion engine, possesses a filter body, which consists of a plurality of compression moulded and high temperature resistant filter plates (10), in particular made of sintered metal powder, metal filings, metal fibres or a mixture thereof, which are disposed above or next to one another and between them form a plurality of flow ducts. To form inlet ducts (3) and outlet ducts (4) the flow ducts are open at one side and are closed on the other side. Walls of the filter plates (1) lying between the inlet and outlet ducts (3, 4) represent filter surfaces. Heat conducting sheets (5) are inserted into the inlet ducts (3).

19 Claims, 1 Drawing Sheet

FILTER FOR THE SEPARATION OF IMPURITIES FROM WASTE GASES

BACKGROUND OF THE INVENTION

The invention relates to filters and in particular, to filters for the separation of impurities from waste gases from the exhaust gases of an internal combustion engine. The filter has a filter and high temperature resistant filter plates, in particular made from sintered metal powder, metal filings, metal fibres or a mixture thereof, which are disposed above and behind one another and between them form a plurality of flow ducts, whereby the flow ducts for forming inlet and outlet ducts are open on one side are closed on the other side, and whereby the walls of the filter plate lying between the inlet and outlet ducts represent filter surfaces.

A filter of this type is described for example in German Offenlegungsschrift 38 18 281. Filters are known in which the soot filter ducts are constructed very short, whereby the filter surface to a large-extent corresponds to the filter body flow-past surface. In this way the quantity of heat is produced with a burn-up of the soot adhering to the filter surface, can be reduced per filter body flow-past surface, as a result the filter system is prevented from being destroyed.

However in such a filter one disadvantage is that it has a very large diameter and for flow technology reasons also has a very large constructional volume because of the flow-past surface.

In principle it would also be possible to connect several smaller filter faces one behind the other and to allow the stream of waste gas to flow through them individually.

However a disadvantage of this is that the constructional expenditure required for this is very cost intensive.

In general one is faced with the problem that the soot filter plants and soot filter systems used at present have the disadvantage that the filter materials used have a lower thermal conductivity than massive materials because of their porosity. This means that with the partial burn-up of the soot in a duct the quantity of heat produced as a result can not be dissipated quickly enough. In this way there is the danger that materials fuse and thus the filter action is impaired. If the soot burns up in several ducts at the same time, such high thermal energy densities can occur in the filter, in particular in the rear region, that the entire filter melts through.

In particular when the filter plates have a poor thermal conductivity, the heat produced during the burn-up of the soot, during which combustion temperatures of over 200° C. can be produced, is transferred to a large extent by the waste gas stream to the outlet of the filter and there results in a feared thermal energy densification which—as mentioned—causes the filter to burn through.

This meant that in practice a corresponding filter wall thickness had to be provided in order to obtain adequate stability and in order to increase the specific heat capacity. On the other hand the filter wall thickness should be reduced as much as possible in order to reduce the gas counter-pressure and therefore the costs.

The object of the invention is therefore to remove the disadvantages mentioned above, in particular to create a filter of the type mentioned at the beginning, in which the risk of a burning through is avoided as far as possible even with an optimal filter action or filter design.

This object is achieved in accordance with the invention in that heat conducting sheets are inserted into the inlet ducts.

SUMMARY OF THE INVENTION

By the heat conducting sheets according to the invention burning through or other damage to the filter plates can be largely avoided. Because of their arrangement and design as heat conducting sheets they can store and distribute the heat produced during the burn-up of the soot in a substantially better manner by their high heat capacity. This means that they protect the filter plates from excess temperatures.

The heat conducting sheets are advantageously disposed so that they extend at least to a great extent over the entire lengths and breadths of the inlet ducts.

So that the heat conducting sheets have the smallest possible negative affect on the inward flow of the waste gases into the filter, in an advantageous further development according to the invention it may be provided that the heat conducting sheets are inwardly set back on the inlet side of the filter body.

In practice it has been shown that a setting-back of approximately 5 to 10 mm is sufficient.

A very advantageous and not obvious further development of the invention may lie in that the heat conducting sheets are provided with one or more recesses or openings at least in the inlet region.

The recesses or openings ensure that the burn-up of the soot adhering to the filter faces is not disturbed and that burn-up is performed in a better manner, as in the region of the recesses and openings the inlet ducts are not divided, and thus the entire space of the inlet ducts in this section is available without any obstruction. However in the rear region, where the risk of burning through is at its greatest because of the higher temperatures, the heat conducting sheets are fully effective.

In practice it has been shown that good values can be achieved when the recesses or openings extend rearwardly over one half, preferably over two thirds, the distance, beginning from the inlet side.

A very advantageous constructive refinement with respect to the recesses or openings may lie in that the recesses are constructed so that—seen in plan view—the recesses are located in the central region, whereby they begin at the front side and have lateral tabs.

For a continuous transition and a more even heat dissipation the ends of the recesses are generally provided with rounded joining sections to the complete faces of the heat conducting plates.

A particularly advantageous constructive refinement with respect to the recesses may lie in that the recesses roughly have the shape of a hyperbola.

With respect to heat capacity, heat distribution and largely undisturbed burn-up, the refinement has proved to be very advantageous.

A condition for the method of operation of the heat conducting sheets is that they are made from a high temperature resistant material, in particular sheet steel.

In an advantageous further development of the invention it may be specified that the heat conducting sheets have surfaces which are at least partially rough. The rough surfaces may be achieved, for example, by coating with powder or fibres, whereby a corresponding enlargement of the surfaces also occurs at the same time. Metal or ceramic materials or high temperature resistant plastics may be used as the powder or fibres.

By this refinement the heat conducting sheets according to the invention have a dual purpose. Apart from their function of absorbing the resultant heat, impurities present in the waste gas may in addition be deposited on the surfaces of the heat conducting sheets. This means that the filter therefore obtains a clear increase in capacity and clearly absorbs more impurities.

BRIEF DESCRIPTION OF THE DRAWINGS

An exemplified embodiment of the invention is described in principle below by means of the drawings.

DESCRIPTION OF THE PREFERRED EMBODIMENTS

The construction of a filter of the type described is basically of a known design, and for this reason it is only briefly described below. It is constructed from a plurality of compression moulded, high temperature resistant filter plates 1, which are disposed above one another or next to one another respectively. The filter plates 1 can be sintered and possess an undulating surface so that flow ducts are produced in the direction of flow (see arrows in FIG. 1). Here the raised parts of the waves 2 simultaneously form spacers for the filter plate 1 lying adjacent thereto, whereby a wave crest lies over a wave trough and vice versa.

The filter plates 1 have an identical construction and are joined to one another in a mirror-image arrangement. At their front ends—with respect to the inlet and the outlet side—they are provided with kinked ends, which end in a flat piece. By the mirror-image structure of the individual filter plates two such flat parts alternately abut one another on the inlet side and the outlet side, while on one side an outlet aperture is produced and on the opposite side an inlet aperture is produced.

Figure 1:
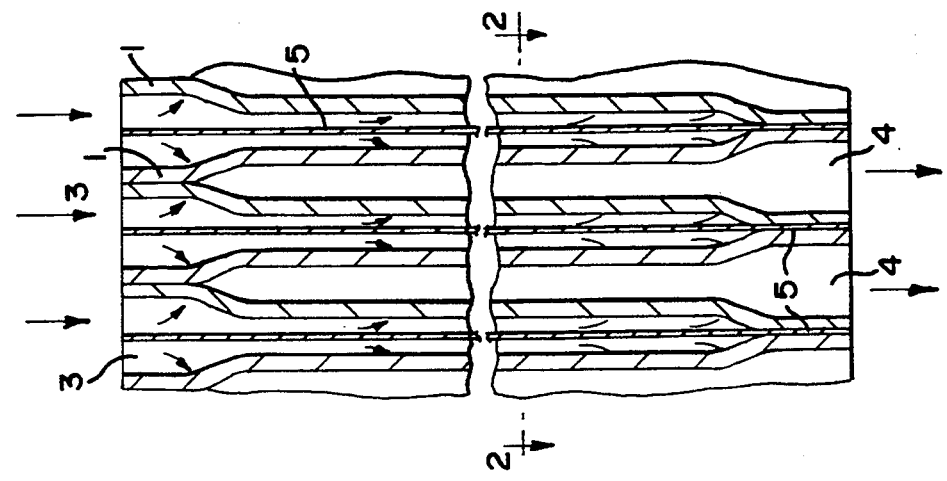
FIG. 1 shows a diagrammatical longitudinal section (as a detail) through the filter body according to the invention.

As is evident from FIG. 1, in this way inlet ducts 3, which are closed on the outlet side, and outlet ducts 4, which are closed on the inlet side, are formed alternately next to one another. The connection of the individual filter plates can be performed by fusion or jig welding at the flat locations.

The sealing along the longitudinal sides is performed by stepped edges (see FIG. 1).

By this refinement the waste gas has to flow through the porous filter walls, which produce the division between the inlet ducts 3 and the outlet ducts 4, whereby the impurities to be separated, in particular soot, become deposited on the filter walls, and whereby soot conversion or soot gasification occurs. After passing through the filter walls between the inlet ducts 3 and the outlet ducts 4, the waste gases cleaned in this way can flow out of the filter body again.

In the inlet ducts 3 are now disposed heat conducting sheets 5, which are correspondingly positioned by the wave crests and wave troughs respectively. The connection with the individual filter plates 1 is performed on the outlet side, whereby the heat conducting sheets 5 are laid between the flat ends and are welded to them, for example.

As can be seen, the heat conducting sheets 5 extend nearly over the entire width and length of the filter plates, whereby however a recess 6 is provided so that, beginning from the inlet side, a central region remains open right up to the last third of the heat conducting sheet 5. This means that the space in the inlet duct 3 is not obstructed by a heat conducting sheet 5 in this region and an unimpeded burn-up of soot, which has been deposited on the filter walls, can occur.

Figure 3:
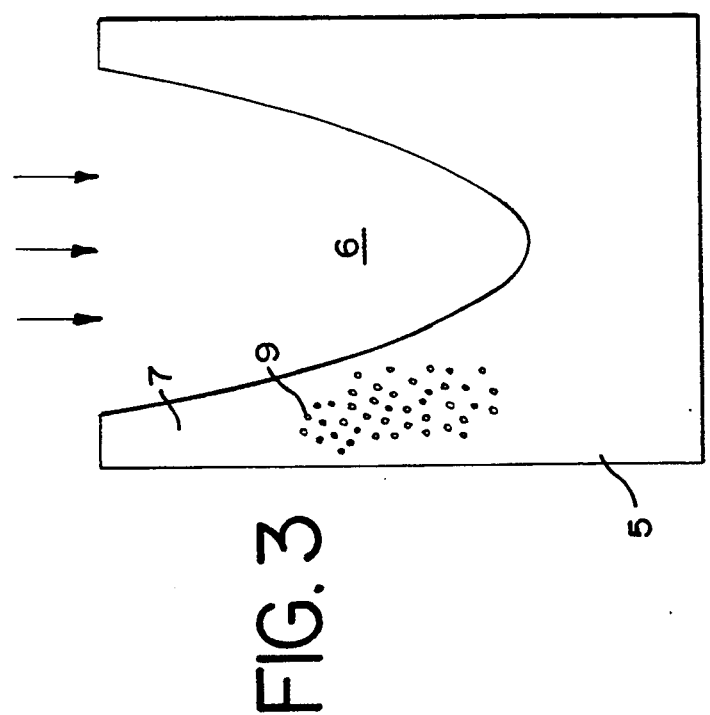
FIG. 3 shows a reduced plan view of a heat conducting sheet according to the invention.

As is evident from FIG. 3, the shape of the recess 6 forms a hyperbola with a correspondingly rounded base region and two lateral tabs 7 and 8.

Single rolled sheets are used as the material for the heat conducting sheets 5, e.g. having a chromium content of 19 to 25% by weight, a nickel content of 20 to 60% by weight, a silicon content of more than 1% by weight and an aluminum content of up to 5% by weight, the rest being iron. Additionally, each heat conducting sheet is between 0.1 and 1.0 mm in thickness.

Figure 2:
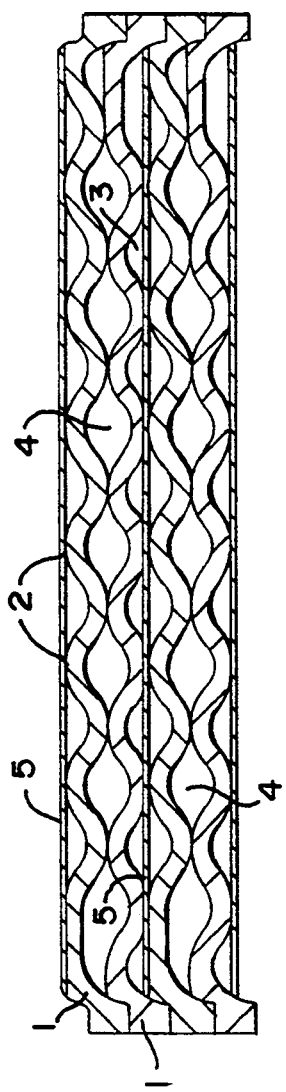
FIG. 2 shows a section along line II—II of FIG. 1.
Figure 4:
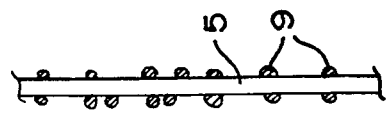
FIG. 4 shows a detailed representation of a heat conducting sheet having coated surfaces.

From FIG. 3 and 4 is evident an exemplified embodiment, in which the surfaces of a heat conducting sheet 5 are coated with powder or fibres 9, as a result of which a corresponding surface enlargement and correspondingly rough surfaces are produced, at which impurities can become deposited.

What is claimed is:

1. A filter for the separation of impurities from the exhaust gases of an internal combustion engine the filter comprising: a filter body, which includes a plurality of compression moulded and high temperature resistant filter plates made from a material selected from the group consisting of sintered metal powder, metal filings, metal fibres and a mixture thereof, which are disposed above or behind one another and form a plurality of flow ducts, whereby the flow ducts for forming inlet and outlet ducts are open on one side and closed on the other side, and whereby the walls of the filter plate lying between the inlet and outlet ducts represent filter surfaces, wherein heat conducting sheets are located in the inlet ducts.

2. A filter according to claim 1, wherein each heat conducting sheet extends at least roughly over the entire length and width of the inlet duct.

3. A filter according to claim 1, wherein the heat conducting sheets are inwardly set back on the inlet side of the filter body.

4. A filter according to claim 1, wherein the heat conducting sheets are provided with one or more recesses or openings at least in the inlet region.

5. A filter according to claim 4, wherein the recesses or openings extend at least over half the length of the inlet ducts.

6. A filter according to claim 4, wherein the recesses or openings extend at least over two thirds of the length of the inlet ducts.

7. A heat conducting sheet according to claim 4, wherein the recesses are constructed so that—seen in plan view—the recesses are located in the central region, whereby they begin at the front side and include lateral tabs.

8. A filter according to claim 7, wherein the rear ends of the recesses are provided with rounded joining sections to the complete faces of the heat conducting sheet.

9. A filter according to claim 8, wherein the recesses are at least approximately the shape of a hyperbola.

10. A filter according to claim 1, wherein the heat conducting sheets are made from high temperature resistant single rolled sheets having a chromium content of more than 19% by weight and a nickel content of at least 20% by weight.

11. A filter according to claim 10, wherein the chromium content is approximately 25% by weight.

12. A filter according to claim 10, wherein the nickel content is between 20 and 60% by weight.

13. A filter according to claim 10, wherein the single rolled sheet has a silicon content of more than 1% by weight.

14. A filter according to claim 10, wherein the single rolled sheet is provided with an aluminum content of up to 5% by weight.

15. A filter according to claim 1, wherein the thickness of each heat conducting sheet is between 0.1 and 1 mm.

16. A filter according to claim 1, wherein the heat conducting sheets are welded at their rear ends to the filter plates.

17. A filter according to claim 1, wherein the heat conducting sheets include at least partially rough surfaces.

18. A filter according to claim 17, wherein the heat conducting sheets are coated with powder or fibres.

19. A filter according to claim 18, wherein the powder or fibres are made from metal or ceramic materials or from plastics.

* * * * *